United States Patent
Djemai et al.

(10) Patent No.: US 11,827,960 B2
(45) Date of Patent: Nov. 28, 2023

(54) PROCESS FOR MANUFACTURING A TITANIUM ZIRCONIUM ALLOY AND ITS EMBODIMENT BY ADDITIVE MANUFACTURING

(71) Applicant: Abdelmadjid Djemai, Deuil la Barre (FR)

(72) Inventors: Abdelmadjid Djemai, Deuil la Barre (FR); Jean-Jacques Fouchet, Lombreuil (FR)

(*) Notice: Subject to any disclaimer, the term of this patent is extended or adjusted under 35 U.S.C. 154(b) by 995 days.

(21) Appl. No.: 16/349,533

(22) PCT Filed: Nov. 30, 2016

(86) PCT No.: PCT/FR2016/053155
§ 371 (c)(1),
(2) Date: May 13, 2019

(87) PCT Pub. No.: WO2018/100251
PCT Pub. Date: Jun. 7, 2018

(65) Prior Publication Data
US 2020/0055118 A1 Feb. 20, 2020

(51) Int. Cl.
| | | |
|---|---|---|
| *C22C 32/00* | (2006.01) | |
| *B28B 1/00* | (2006.01) | |
| *B33Y 70/10* | (2020.01) | |
| *B22F 10/28* | (2021.01) | |
| *B22F 10/34* | (2021.01) | |
| *B33Y 80/00* | (2015.01) | |

(52) U.S. Cl.
CPC ............ *C22C 32/001* (2013.01); *B22F 10/28* (2021.01); *B22F 10/34* (2021.01); *B28B 1/001* (2013.01); *B33Y 70/10* (2020.01); *C22C 32/0031* (2013.01); *B22F 2301/052* (2013.01); *B22F 2301/205* (2013.01); *B22F 2301/30* (2013.01); *B22F 2301/45* (2013.01); *B22F 2304/054* (2013.01); *B22F 2304/056* (2013.01); *B22F 2304/10* (2013.01); *B22F 2998/10* (2013.01); *B22F 2999/00* (2013.01); *B33Y 80/00* (2014.12)

(58) Field of Classification Search
CPC .. B22F 10/20; B22F 2301/30; B22F 2304/10; B22F 2999/00; B22F 2301/052; B22F 2304/056; B22F 2301/45; B22F 2301/205; B22F 2304/054; B22F 2998/10; B28B 1/001; C22C 32/001; C22C 32/0031; C22C 1/051; C22C 1/0458; C22C 32/0015; C22C 1/08; B33Y 70/10; B33Y 10/00; B33Y 70/00; B33Y 80/00; Y02P 10/25; A61C 13/0013
See application file for complete search history.

(56) References Cited

U.S. PATENT DOCUMENTS

| | | | | |
|---|---|---|---|---|
| 2010/0297432 A1* | 11/2010 | Sherman | ............. | C04B 35/5154 428/323 |
| 2012/0156472 A1* | 6/2012 | Brannvall | ............. | A61K 6/818 427/2.29 |

* cited by examiner

*Primary Examiner* — Monica A Huson
*Assistant Examiner* — Kelsey C Grace
(74) *Attorney, Agent, or Firm* — Luis Figarella

(57) ABSTRACT

The invention relates to a method for producing a composite material consisting of a metal and ceramic alloy, comprising steps of: producing a mixture of metal powder and ceramic powder, the particle size of the metal powder being micrometric and the particle size of the ceramic powder being nanometric; and exposing said mixture to a focused energy source that selectively fuses part of a bed of said powder mixture.

12 Claims, 5 Drawing Sheets

PROCESS FOR MANUFACTURING A TITANIUM ZIRCONIUM ALLOY AND ITS EMBODIMENT BY ADDITIVE MANUFACTURING

TECHNICAL AREA

Pure titanium and its alloys have received considerable attention in many applications, including the medical industry, because of their increased strength, corrosion resistance, and, above all, their biocompatibility and daring integration.

The Ti6Al4V duplex alloy consists of alpha and beta phases, consisting of 6 percent aluminum and 4 percent vanadium (Ti-64) and was considered the most suitable because it has enhanced mechanical properties compared to pure titanium.

However, the titanium alloy has a low hardness value and poor wear and oxidation resistance, particularly where tribological behavior is known, such as in valves and pin connections.

When placed in a depleted oxygen environment, typically in dental or bone implants, it is likely to release aluminum and vanadium ions, which are considered to be harmful to body fluids.

To overcome the problems of diffusion of aluminum ions and vanadium, the current techniques work on changing the surface nature of this titanium alloy using different surface engineering techniques, for example the deposition of a ceramic layer of zirconium type.

These are generally polycrystalline inorganic silicates, oxides and carbides. They are refractory in nature, and have a high compressive strength. Bioceramics can be subdivided as bio-inert, bioactive, and biodegradable materials.

Zirconia, which behaves like ceramics, comes in three phases, monoclinic, cubic and tetragon, which can improve the final properties of the coatings produced. Bio-inert ceramics such as zirconia maintain their physical and mechanical properties, even in biological media and highly corrosive media. Zirconia is very wear-resistant and withstands stress-induced hardening by transformation.

The main application of zirconia ceramics in the medical field is in total hip prosthesis (THA), where it is used as a duplex coat alloy of Ti6Al4V-type titanium alloy implant head. Another application of zirconia ceramics is in the space field, as a thermal shield in aircraft reactors and satellite Many studies have been made on the surface modification of titanium or a titanium alloy to improve their surface properties or to make a Titanium Zirconia mixture pressed at high temperature, we cite the following publications:

Y. Zhong et al. "Characterization and thermal shock behavior of composite ceramic coating doped with ZrO2 particles on TC4 by micro arc oxidation", Applied Surface Science, 311, 158-163 (2014), deposition of ZrO2 layer by micro-arc on Titanium parts (TA6V), the objective was to increase the hardness of titanium.

Patrik Stenlund et al., "Osseointegration Enhancement by Zr doping of Co—Cr—Mo Implants Fabricated by Electron Beam Melting" Hiroaki al, Science Direct (2015), the addition of 0.04% zirconia increases osseointegration.

Y. Zhong et al., "Characterization and thermal shock behavior of composite ceramic coating doped with ZrO2 particles on TC4 by micro-arc oxidation", Applied Surface Science, 311, 158-163 (2014).

Keiichiro Tohgo et al., Shizuoka University (Japan), "Manufacturing of PSZ-Ti composites by spark plasma sintering and their mechanical properties", Materials Science & Engineering, A621, 166-172 (2015).

T. Fujii, K. Tohgo, H. Araki, K. Wakazono, M. Ishikura, Y. Shimamura, J. Solid Mech. Mater. Eng. 41699-1710 (2010).

N-R Park et al., "Fast low-temperature consolidation of a nanostructured 2Ti—ZrO2 composite for biomedical applications", Ceramics International, 40, 6311-6317 (2014).

Proceedings: Tohgo et al., "Progress of Composites" 2008 in Asia and Australasia—The 6th Asian-Australasian Conference on Composite Materials, ACCM (2008).

Chien-Cheng Lin et al., "Effect of Yttria on Interfacial Reactions Between Titanium Melt and Hot-Pressed Yttria/Zirconia Composites at 1700° C.", Université Chiao Tung (Taiwan), J. Am. Ceram. Soc., 91, 2321-2327 (2008).

J. Cao et al., "Brazing ZrO2 ceramic to Ti-6A1-4V alloy using NiCrSiB amorphous filler foil": Interfacial microstructure and joint properties, Materials characterization 81, 85-91 (2013).

The state of the art can be defined by patents;

"Titanium-zirconium binary alloy for surgical implants and corresponding production method" filed on Jun. 10, 1997 by Straumann AG under number WO1997029624A2, in this embodiment the Titanium Zirconia mixture is by hot forging.

"Titanium-based alloy" filed May 6, 2006 by Igor Vasilievich Alsous the number

Powder mixed titanium and zirconium oxide" filed Dec. 20, 2005 by Degussa, Kai Schumacher, Oswin Klotz, Uwe Dienersous the number WO2006067129A2

"Basic Products for the Manufacture of Ceramic Materials" filed on 28 Jan. 1987 by Degussa Aktiengesellschaft under number EP0241647A2

"Titanium dioxide doped" filed Mar. 29, 2000 parDE-GUSSA AG under the number EP1138632A1

"Coprecipitated titanium dioxide/silicon dioxide and titanium dioxide/zirconium dioxide coprecipitates as polycondensation catalysts for polyesters and copolyesters" filed Jan. 2, 1995 by AkzoNobel NVsous the number U.S. Pat. No. 5,684,116

Moreover, additive manufacturing and for certain additive technologies precisely (SLM, EBM, SLA) are techniques of interest for the manufacture of implants or prosthesis since they present several possibilities of control of the geometry, the porosity, inter-connectivity and 3D architecture through changes in manufacturing parameters, including the key parameters for selective laser fusion technology:

the power of lasers
the scan speed
the diameter of the spot
the laser route strategy
the overlap between two melting points
the thickness of the layers of the powder Selective Laser Melting (SLM), SLM is a process used to manufacture complex three-dimensional components from metal powders, ceramic or polymer powders. The technology is mature and already used in the aeronautics and medical industries to manufacture complex components with high densities and homogeneity. We cite one of the first patents of the Fraunhofer Institute in Germany, filed Oct. 27, 1997 under number WO1998024574A1, which describes the SLM process in a more precise way. The name SLM will be maintained throughout the text of the patent.

However, this manufacturing technique does not appear to be suitable for shaping a material comprising both zirconia ceramics and a metal such as titanium, in view of the significant difference between the melting points of two materials that prohibit a priori a merger of each of them being exposed to the same temperature.

There is therefore a real need to create a biocompatible material, consisting of a metal alloy and ceramic, precise shaping for the production of complex components and meeting the requirements in terms of mechanical properties.

SUMMARY OF THE INVENTION

To remedy this problem, the invention relates to a method of manufacturing a composite material of metal alloy and ceramic, comprising the steps of:
- Preparation of a homogeneous mixture of metal powder and ceramic powder, the particle size of the metal powder being micrometric and the particle size of the ceramic powder being nanometric,
- Exposing said mixture to a focused energy source which selectively fuses a portion of a bed of said powder mixture.

The method according to the invention may furthermore have one and/or the other of the following characteristics:
- the metal powder comprises pure titanium or an alloy comprising Ti6AlV4.
- the ceramic powder comprises zirconia, preferably of stabilized zirconia type in quadratic form, more preferably of yttria-type zirconia type (YSZ) with a concentration of yttrium oxide of between 11 and 30% in zirconia.
- the particle size of the metal powder is between 5 and 50 microns and the granulometry of the ceramic powder is between 5 and 250 nm
- the focused energy source is a laser spot
- the exposure time of a melting zone is less than 5 seconds
- the thickness of the powder bed is between 5 and 50 microns
- the melting temperature is greater than 1650° C.
- the proportion of metal powder is greater than 40% by volume and less than 99.5% by volume.
- the proportion of ceramic powder is greater than 0.4% by volume and less than 60% by volume.

The invention also relates to a method of manufacturing an object of a given geometric shape, consisting of a material manufactured according to the method of one of the preceding claims, comprising the steps of:
- depending on the geometric shape to be produced, preparing virtual slices of the object to be made of given thickness along an axis of construction of the object,
- Preparation of a homogeneous mixture of metal powder and ceramic powder, the particle size of the metal powder being micrometric and the particle size of the ceramic powder being nanometric,
- Depositing on a substrate a layer of the homogeneous powder mixture of a thickness corresponding to that of the wafer of the geometric shape to be produced
- Exposing said homogeneous powder mixture of said first layer to a focused energy source which selectively fuses a portion of the bed of said powder mixture at the locations corresponding to the virtual wafer to be produced, whereby a first wafer of the shape is obtained; geometric to be made, within the first layer of powder mixture
- Depositing an nth layer of powder mixture on the previous layer including the edge of the object made in the previous step, and exposing the nth layer to the focused energy source to obtain a n-th slice of the geometric shape to be made within an n-th layer of powder mixture
- repetition of the previous step until the geometric shape to be achieved.

The invention also relates to a biocompatible object, such as an implant or a prosthesis, produced by the implementation of the method above.

The invention also relates to an object of the automotive or aeronautical industry produced by the implementation of the method above.

The invention relates to a composite material obtained by melting and cooling a homogeneous mixture of microparticles of a first metallic material with a given melting point, and nanoparticles of a second ceramic material having a higher melting temperature. defining a network of dendritic zones of the first metallic material at the micron scale interspersed with nanometric filamentary zones of the second ceramic material According to the invention, the material may have one and/or the other of the following characteristics:
- the ceramic material is a zirconia and the metallic material is titanium
- the zirconia is yttria-stabilized and wherein the content of Y2O3 is between 0.1 and 0.5% by volume of the material
- the TiO2 content is between 0.1 and 0.2% by volume of the material
- the content of HfO2 is less than 2% by volume of the material
- the material consists of a network e cells or interconnected unitary units defining a porous structure The invention relates to a biocompatible object, such as an implant or a prosthesis, or the automotive or aeronautic industry, consisting of the material as described above.

Definitions

Conventionally called "composite" means a material containing both a ceramic phase and a metallic phase with a base matrix, said matrix is either metal and there is called CMM (Composite Matrix Metal) or ceramics and one speaks CMC (Ceramic Matrix Composite).

A product is conventionally called "molten" when it is obtained by a process implementing a raw material melting phase and a cooling solidification phase.

A precursor of $ZrO_2$, $Al_2O_3$, $TiO_2$, or $Y_2O_3$ is a compound able to lead to the formation of these oxides by a process comprising melting and cooling solidification.

"$ZrO_2$", "zirconium oxide" and "zirconia" are synonyms. When referring to "$ZrO_2$", zirconium oxide or zirconia, it is necessary to understand ($ZrO_2$+$HfO_2$). Indeed, a little $HfO_2$, chemically inseparable from $ZrO_2$ and having similar properties, is still naturally present in zirconia sources at levels generally less than 2%. In other words, "$ZrO_2$+$HfO_2$" means $ZrO_2$ and traces of $HfO_2$ naturally present in zirconia sources.

The "melting point" indicates a zone or basin on the bed of powder where the laser melts the material, one speaks of "melting pool" in the English literature.

DESCRIPTION OF THE FIGURES

Other features and advantages of the invention will become apparent on reading the description which follows and on examining the appended figures in which.

DETAILED DESCRIPTION

Figure 1:
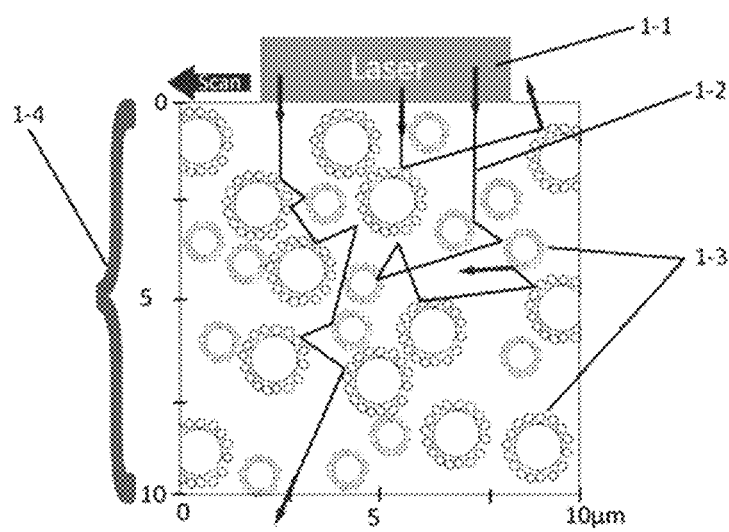
FIG. 1 shows schematically the passage of the laser fusion energy of a thickness of 10 microns on the powder bed according to the invention.
Figure 2:
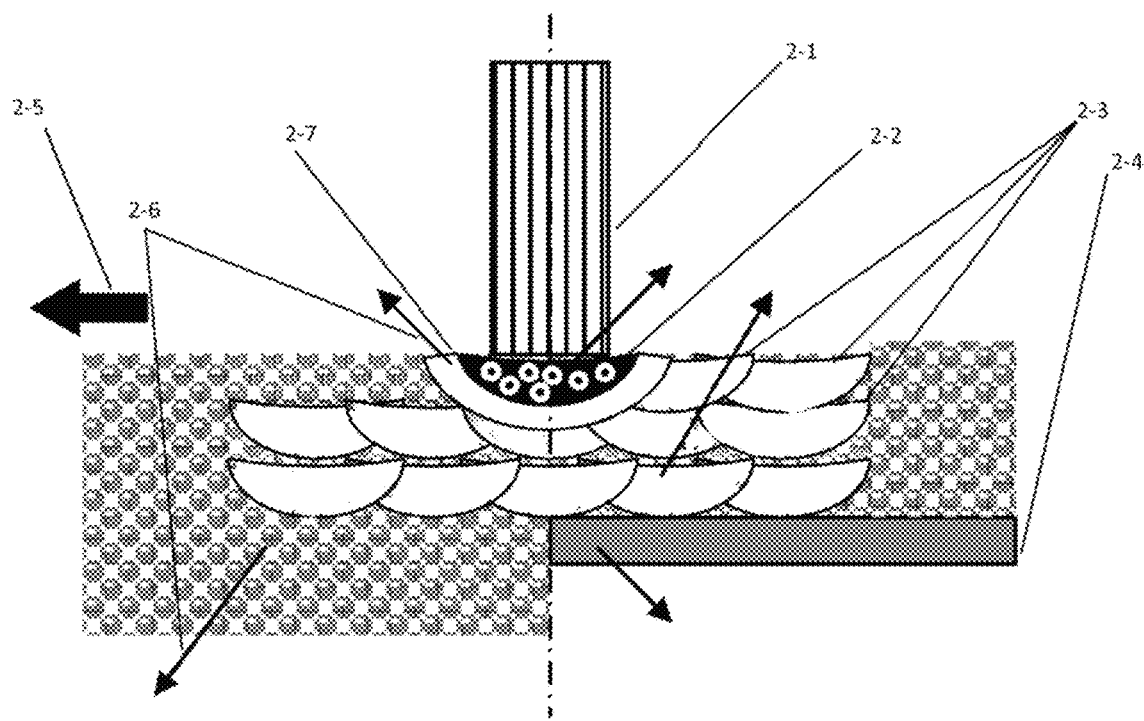
FIG. 2 shows schematically in section the laser melting points and their recovery according to the invention.

The present invention aims to create a biocompatible material, consisting of a metal alloy and ceramic, precise shaping for the production of complex components and meeting the requirements in terms of mechanical properties. For this purpose, the invention generally relates to a process for manufacturing a metal-ceramic alloy by additive manufacturing, mainly comprising the steps of:
- preparation of a homogeneous mixture of metal powder and ceramic powder, the particle size of the metal powder being micrometer and the particle size of the ceramic powder being nanometric,
- subjecting said mixture to a focused energy source that is selectively merge a portion of a bed of said powder mixture.

So that both the metal powder particles and the ceramic powder particles melt while exposed to the same temperature of the energy source spot and have very different melting temperatures. The invention provides a particle size of the metal powder of between 1 and 200 microns, preferably between 5 and 50 microns and a particle size of the ceramic powder of between 1 and 800 nm, preferably between 5 and 250 nm. Ideally, the proportion of metal powder is greater than 40% by volume and less than 99.5% by volume. Preferably, the proportion of ceramic powder is greater than 0.4% by volume and less than 60% by volume.

Furthermore, preferably, the focused energy source is a laser spot programmed to act on a melting zone during an exposure time of less than 5 seconds and preferably greater than 10 ms, so that this melting zone reaches or exceeds a melting temperature of 1650° C.

For an application in the biomedical field, the preferred metal powder is a pure titanium powder or an alloy comprising Ti6Al4V type, and the preferred ceramic powder is a zirconia powder, preferably zirconia type stabilized quadratic form, preferably Yttria-type zirconia type (YSZ) with a concentration of yttria between 11 and 30% in zirconia. The addition of zirconia in titanium increases the hardness of the material and the resistance to wear.

Since the material according to the invention is generated by an additive manufacturing process, it is advantageous to shape it according to a given geometric shape, at the same time as it is created.

For this purpose, depending on the geometrical shape to be produced, virtual slices of the object to be made of given thickness are prepared along an axis of construction of the object. It is possible that this shape includes porous areas allowing for example bone growth, or allowing the final object to have desired mechanical properties.

A homogeneous mixture of micrometric metal powder and nanoscale ceramic powder is used which is deposited on a substrate in the form of a layer of the powder mixture of a thickness corresponding to that of the wafer of the geometric shape to be produced.

The powder mixture of said first layer is then exposed to the laser spot which selectively fuses a part of the bed of said powder mixture at the locations corresponding to the virtual wafer to be produced. To form a porous structure, the spot is moved to define a network of interconnected unit cells defining a porous structure as will be explained in the following.

This gives a first portion of the geometric shape to be produced, within the first layer of powder mixture.

An operation is repeated for depositing an n-th layer of powder mixture on the previous layer including the edge of the object made in the previous step, and exposing the n-th layer to the source of focused energy to obtain an n-th slice of the geometric shape to achieve until obtaining the geometric shape to achieve.

This method according to the invention makes it possible to obtain a biocompatible object, such as an implant or a prosthesis, when biocompatible metal and ceramic powders are used.

It makes it possible to obtain objects of the automotive or aeronautic industry of great precision and with interesting mechanical properties.

In the following, certain aspects of the method according to the invention are described with reference to the figures:
Preferred Powder Mixture, Especially for Application in the Biomedical Field More specifically, in a preferred embodiment for an application in the biomedical field, the metal powders are pure titanium or a Ti6AlV4 type alloy consisting of alpha and beta phases, consisting of 6% aluminum and 4% vanadium.

The ceramic powders are Zr zirconia/stabilized zirconia/zirconia yttria ZrO$_2$/Y$_2$O$_3$ type with a concentration of yttrium oxide 11.8%≤Y$_2$O$_3$<30%. Zirconia exists in one of three crystalline forms (allotropic forms), monoclinic, quadratic, cubic with melting temperatures of 1100° C., 2300° C. and 2700° C., respectively. These transformations are accompanied by variations in volume (dilatation of 3 to 5% during the quadratic-monoclinic transformation). Since the sintering temperature is around 1450° C., it is necessary to stabilize the zirconia in one of the high temperature structures in order to avoid fragmentation during cooling. The addition of some % MgO, CaO, Y$_2$O$_3$ or CeO$_2$ leads to this result. In the present invention Y$_2$O$_3$ is used to stabilize zirconia, Y-TZP: (zirconia stabilized in quadratic form with yttrium oxide (Y$_2$O$_3$).

The powder mixtures according to the invention may also comprise one or more of the following optional characteristics:
preferably, the content of titanium Ti or a Ti6Al4V alloy is greater than 40%, preferably greater than 60% and/or, preferably, less than 99.50%, preferably less than 95.5%.

A pure titanium powder or a Ti6AlV4 alloy according to the invention may also comprise one or more of the following optional characteristics:

A particle size less than 70 μm, preferably less than 45 μm; preferably less than 30 microns, preferably less than 10 microns, preferably greater than 5 microns.

In a first particular embodiment, the yttria-containing zirconia powder has a particle size of less than 250 nm, preferably less than 130 nm, and/or a median size of between 65 nm and 85 nm, and/or a minimum size greater than 30 nm;
  in a second particular embodiment, the yttria-containing zirconia powder has a particle size of less than 75 nm, preferably less than 70 nm, and/or a median size of between 35 nm and 50 nm, and/or an upper minimum size. at 15 nm, preferably greater than 20 nm;
  in a third particular embodiment, the yttria-containing zirconia powder has a particle size of less than 40 nm, preferably less than 35 nm, and/or a median size of between 10 nm and 25 nm, and/or an upper minimum size. at 3 nm, preferably greater than 5 nm.
  in a fourth particular embodiment, the yttria-containing zirconia powder has a particle size of less than 15 nm, preferably less than 10 nm, and/or a median size of less than 5 nm.

Preferably, the content of $ZrO_2/Y_2O_3$ is greater than 0.4%, preferably greater than 13.5% and/or, preferably, less than 30.0%, preferably less than 60%; preferably, the content of $Y_2O_3$ is less than 1.7%, preferably less than 1.6%, of less than 1.5%, preferably less than 1.4%, preferably less than 1.3%, preferably less than 1.2%, preferably less than 1.1%, preferably less than 1.0%, preferably less than 0.9%, preferably less than 0.8%, preferably less than 0%., 5%, or even less than 0.4% and/or preferably greater than 0.1%;
  the content of $TiO_2$ titanium dioxide of the reaction of titanium with the oxygen provided by Yttrium $Y_2O_3$ is preferably less than 0.4%, preferably less than 0.3%, more preferably less than 0.2%, and/or preferably greater than 0.01%, preferably greater than 0.1%;
  preferably, the content of $Y_2O_3$ is between 0.1% and 0.5% and the $TiO_2$ content is between 0.1% and 0.2%;
  the content of "other oxides" is preferably less than 1.5%, preferably less than 1%, preferably less than 0.7%, preferably less than 0.5%, preferably less than 0, 3%, preferably less than 0.2%, or even less than 0.1%, the oxidation properties are advantageously improved;
  preferably, the "other oxides" are impurities;
  preferably, the $HfO_2$ content is less than 2.0%, less than 1.8%, less than 1.6%, or even less than 1.4%;
  In another embodiment, the $Y_2O_3$ content is greater than 0.1%, greater than 0.2%, greater than 0.3%, greater than 0.4%, or greater than 0.5%, greater than 0.6%, or greater than 0.7%.

Preferably, the titanium-zirconia composite material containing the two components titanium and zirconia according to the invention
  (i) is a titanium metal matrix composite (MMC) alloy with a proportion greater than 60% by volume and a proportion of zirconia of less than 30% by volume but greater than 0.5% by volume, or
  (ii) is a titanium metal matrix composite (MMC) alloy with a proportion of greater than 99% by volume and a zirconia proportion of less than 1% by volume but greater than or equal to 0.04% by volume,
  Moreover, it contains 0.1 to 0.3% by volume of oxygen Obtaining a Homogeneous Mixture of Powders A homogeneous mixture of powders, that is to say in which a majority of the metal microparticles are each surrounded by ceramic nanoparticles, without aggregates of these ceramic particles, is obtained by mixing these powders in the proportions indicated within a mixer or blender, and subjecting them to three-dimensional stirring for 45 minutes to 10 hours with a continuous random stirring frequency or interrupted until a homogeneous stable mixture in the sense that the arrangement of Ceramic nanoparticles surrounding the microscopic particles of metal endures in the absence of oxygen. For example, the preferred mixer for this operation is a device called Turbulat®.

Additive Manufacturing of the Alloy According to the Invention

The additive manufacturing of bi-component metal/ceramic parts by SLM involves significant thermal stresses due to localized laser heating and phase changes generating heterogeneous microstructures. Ductile materials, with high thermal conductivity and high tenacity behave much better with the SLM process, ceramic materials will tend to crack if the cooling is not mastered The addition of a low-melting point metal material as a binder can be used for the additive manufacture of ceramics, but without particular precaution, only the metal component melt constituting the dense network of the piece, the ceramic remains porous.

To overcome the porosity problem and according to the invention, the low melting point metal material is at a micrometric scale and the ceramic is at a nanoscale. This precaution in the different particle sizes of the two types of powder makes it possible to obtain a functional and dense piece, since a total melting of the metallic elements and the ceramic elements is obtained.

It is important that the two types of metal and ceramic powders according to the invention are melted (and not sintered for example) because the use of sintered grains, co-precipitated grains or melted grains determines the properties of the final material and for applications in the field of biomedical, aerospace or automotive, the properties sought for the material according to the invention are those obtained in melted grains.

The micrometric metal and nanometric ceramic powders are mixed in particular proportions (5% zirconia and 95% titanium) with a Turbulat® mixer for a stirring time of 5 hours to obtain a homogeneous mixture where the nanoparticles of zirconia wrap the microparticles of titanium, thus forming a zirconia layer advantageously distributed on the titanium particles. In this embodiment and according to the invention, the low melting point metal component causes the melting of the zirconia nanoparticles.

The homogeneous mixture of pure Ti titanium powders or Ti6Al4V alloys with nanometric $ZrO_2/Y_2O_3$ powders is produced under an argon-type inert gas or under vacuum until a homogeneous mixture is obtained with the formation of particles-coating films. of titanium with $ZrO_2/Y_2O_3$.

According to the invention, and to achieve complete melting of a mixture of metallic powder and zirconia type ceramics powders yttria (YSZ), the mixture is fused by a concentration of a source fiber laser type energy ytterbium, $CO_2$ or plasma.

More specifically, the material according to the invention is produced during the shaping of the object by additive manufacturing.

Thus, the invention relates to the method of manufacturing this new material concomitantly to its shaping, comprising the following successive steps:
  A) A) preparing a digital file of a geometric shape to be produced, said digital file is sliced virtually from (1) to (n) in appropriate thicknesses with respect to the Z construction axis.
  B) B) preparation of a mixture of pure titanium or a titanium alloy, zirconia, yttrium oxide ($Ti/ZrO_2/Y_2O_3$)
  C) C) placing under argon a laser melting chamber
  D) D) heating of a titanium substrate or plate minimum temperature 200° C. maximum temperature 1500° C.

E) E) depositing a first layer of the Ti/ZrO$_2$/Y$_2$O$_3$ mixture on a titanium substrate or plate according to step C), the thickness of the powder bed is less than 50 µm and greater than 5 µm F) F) A focused energy source selectively fuses a portion of the powder bed according to the slicing described in step A)

G) G) Steps E) and F) are executed "n" times where (n) represents the number of layers of the shape to be made.

Special Precautions

Figure 5:
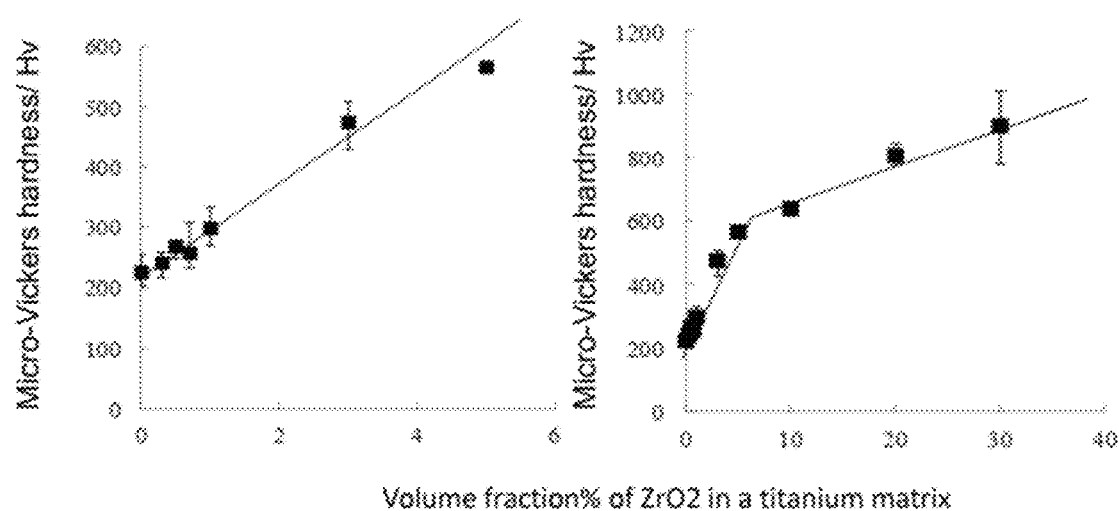
FIG. 5 shows the correlation between the volume faction of ZrO$_2$ and the hardness of the alloy Ti/ZrO$_2$ according to the invention
Figure 6:
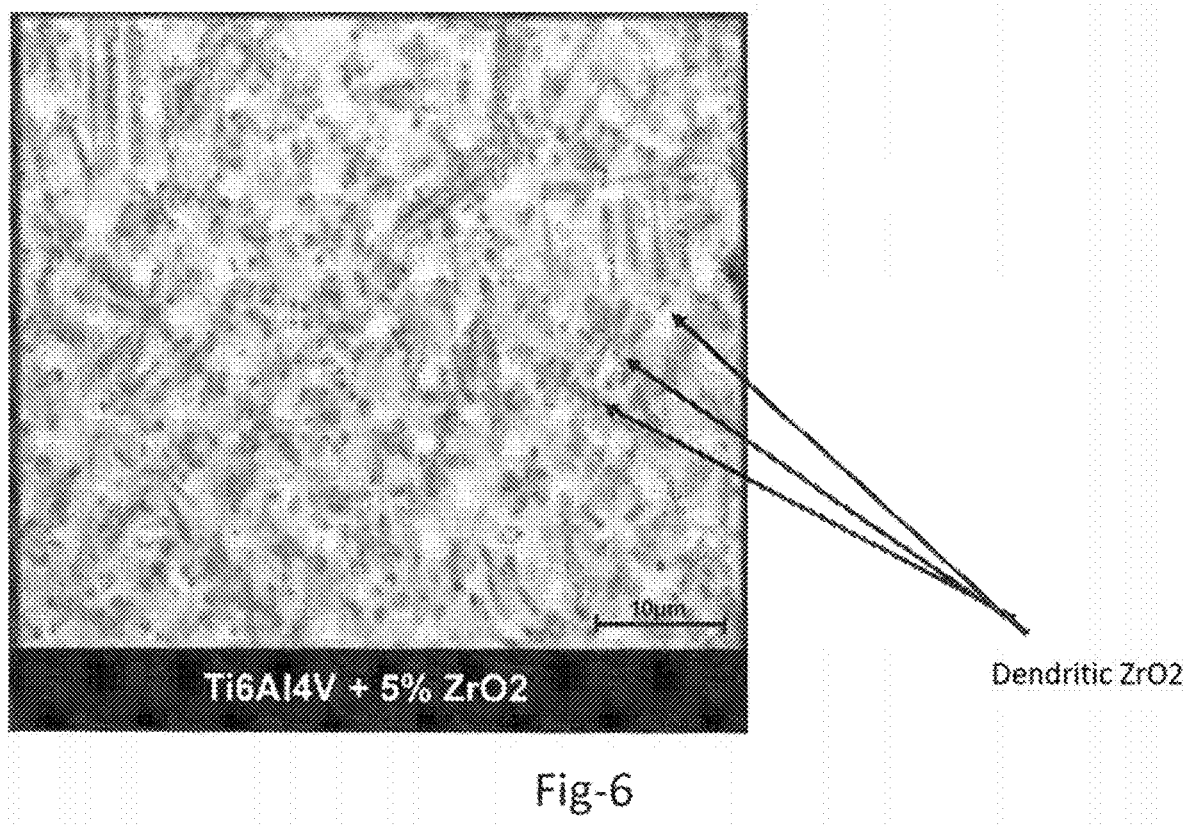
FIG. 6 is a SEM image obtained for a material according to the invention made from microscopic Ti6Al4V powders and 5% nanoscopic zirconia.

During the melting process, a portion of the oxygen atoms react with titanium to form TiO$_2$ titanium oxide, which can contribute to the improvement of the hardness of the titanium phase as shown in the curve in FIG. 5). Indeed, the hardness increases considerably with the increase of the ZrO$_2$ content up to 1 vol. %. The compressive strength of composites can increase in a manner similar to hardness. Even a very small amount of ZrO$_2$ contributes to the formation of titanium oxide, which leads to an improvement in the hardness of the interactive Ti/ZrO$_2$ alloy.

Figure 4:
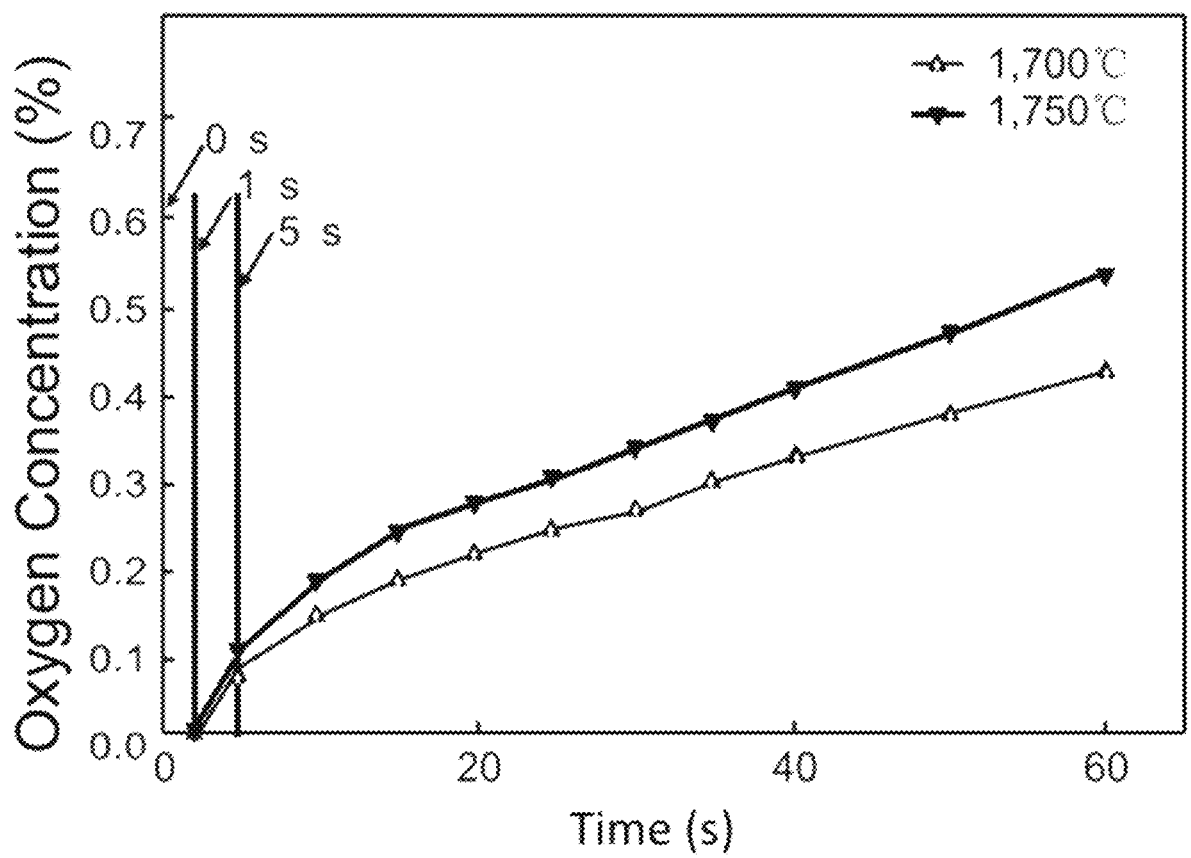
FIG. 4 represents the time diffusion of oxygen in the Ti/ZrO$_2$ alloy according to the invention.

In order to limit the oxygen concentration during melting, the exposure time of the laser spot in the melting zone (titanium in the liquid phase) does not exceed 5 seconds, advantageously the exposure time is less than 1 second as shown in the curve in FIG. 4.

The oxygen concentration remains low up to 9.5 µm depth of the laser spot as indicated in the curve in (FIG. 3), the inflection point is 10 µm from the laser spot, beyond this thickness of the Powder bed the increase in oxygen level is exponential.

The depth of the laser spot (1-1) corresponds to the thickness of the powder bed (1-4) where the melting of the materials reacted is total. The radiation of the focused energy (1-2) on a melting point is absorbed largely by the reaction materials (titanium, zirconia) (1-3). Since the titanium powder is at the micrometer scale coated with zirconia powder at a nanoscale, the passage of the titanium grain from the solid phase to the liquid phase causes the zirconia grains to melt on its surface. (1-3).

The fusion and the cohesion between the melting points (2-3) depends on the spot and the power of the laser, in an advantageous embodiment the spot of the laser (2-1) is between 0.1 mm and 0.2 mm and a laser power of 400 W and still advantageously 1000W. The cohesion of the melting points (2-3) depends largely on the state (liquid, solid or semi-solid) in which the melting point is when the laser passes in the direct mode or in the cross mode. The modes of passage of the laser depend on the strategy of the course implemented to scan the surfaces.

Figure 3:
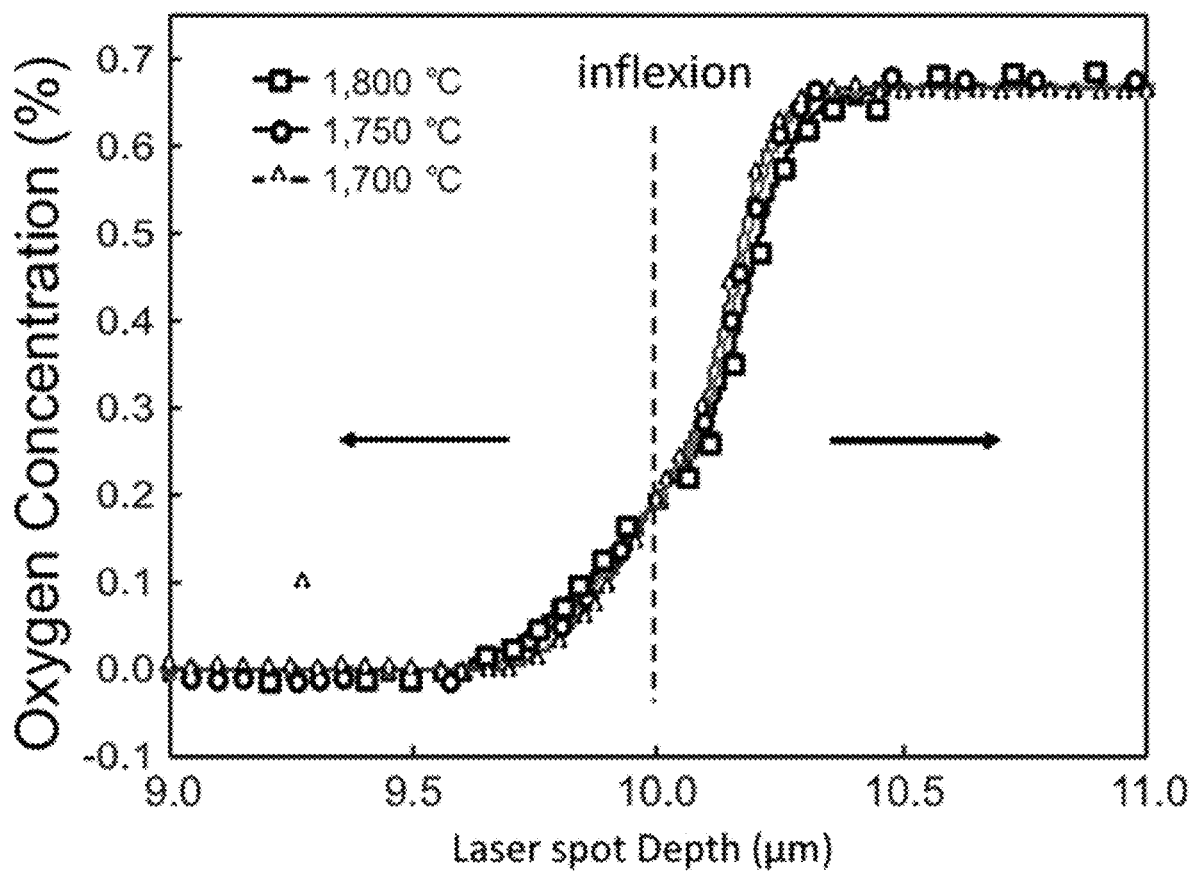
FIG. 3 shows the concentration of the oxygen curve in the Ti/ZrO$_2$ alloy at different temperatures.

The titanium-zirconia melting is advantageously carried out with an exposure time of the unit melting point of less than 1 second as indicated in the curve in (FIG. 4) and on a layer thickness of the powder bed of less than 10 µm as indicated in FIG. the curve in (FIG. 3)

The mechanical properties of the Ti/ZrO$_2$ composite materials are greatly affected by the formation of titanium oxide in the titanium matrix.

The powder bed is maintained at a temperature of 200° C. (2-6) in this embodiment or advantageously 400° C., the preheating is provided by an electrical resistance placed at the lower level of the substrate (2-4) plateau embodiment, with a holding time of 50 seconds or advantageously 100 seconds, and the selected melting temperature is 1700° C., or preferably 1750° C., or preferably 1800° C. The variation of the oxygen content in the Ti/ZrO$_2$ interactive mixture and the thickness of the reactive layer are two closely related parameters.

The reactive layer thicknesses vary with the holding time at different melting temperatures of 1700° C., 1750° C. or 1800° C., the preheating temperature being set at 200° C.

As the melting time increases, the oxygen diffuses into the molten material and reacts with the titanium, so that the thickness of the reactive layer on the Ti face gradually increases.

The variation of the thickness of the reactive layer can be divided into three stages: inoculation (0-1 s), linear increase (1-5 s) and parabolic increase (after 5 s) (FIG. 3). This is because the chemical reaction between Ti in the liquid phase and ZrO$_2$ takes place under the global action of temperature and concentration.

The higher melting temperature results in a higher oxygen content and a greater thickness of the reactive layer. The O content increases with the increase of the holding time of the laser spot on a reaction zone. The evolution of the thickness of the reactive layer can be divided into three stages: inoculation (0-1 s), linear increase (1-5 s) and parabolic increase (after 5 s).

Definition of a Porous Structure

Thanks to the additive manufacturing technique, the material according to the invention can be designed and shaped at the same time with not only a particular geometric shape, but also a specific porosity if necessary.

The realization of an object of a particular and non-porous geometric shape is effected by moving the energy source so that the formed melting points overlap in the three dimensions.

On the contrary, to generate a porous structure, the energy source is displaced so as to define a multitude of unit cells or unitary three-dimensional and interconnected units.

The basic cell or unit cell constituting the porous structure made by stacking layers, is of geometric shape in three dimensions (x, y, z), the unit cell is formed by at least three edges with an angle opening d at least 10°, such as a trihedron, and the unit cell may be of regular or irregular shape in the form of a pyramid, tetrahedron, cubic, octahedron, icosahedron, dodecahedron and without shape limitation. In a preferred embodiment, the unit cell will be of reinforced dodecahedron form.

In another embodiment, the unit cell is formed of 12 edges with edge opening angles of 30° to the vertical axis or construction axis. The edges can be regular or irregular depending on the density of the mesh and the desired porosity.

Said porous structure obtained may have a porosity of between 30% and 80%, a pore size of between 100 µm and 500 µm and a pore distribution of between 500 µm and 700 µm with total interconnectivity. In a preferred embodiment the porosity between 60% and 70%, the pore size between 200 microns and 300 microns with a distribution of porosity between 100 microns and 600 microns and a total inter connectivity. Its parameters are thus close to the characteristics of the human bone in the maxillary and the mandible.

Several forms of porosity can be selected with the possibility of defining pore distribution zones of different sizes.

Process Possibly Involved in the Fusion

To achieve the fusion, it is important to understand the interaction between a titanium alloy and a refractory material of ceramic type (Zirconia). The interaction of the Ti/ZrO2 pair is a multivariate, tightly coupled, unstable, nonlinear and unbalanced process. The following table describes all thermo-physical parameters of the titanium and zirconia.

Thermophysical parameters of titanium and zirconia

| | Ti | $ZrO_2$ |
|---|---|---|
| Density (g/cm3) | 4.13 | 5.77 |
| Specific heat (J/(g.° C.) | 0.5275 | 1.5 |
| Thermal conductivity (w/(cm.C.°)) | 0.1704 | $6.8 \times 10^{-5}$ |
| Crystallization temperature (J/g) | 435.4 | — |
| Reaction to heat (J/g) | 1.023 | — |
| Coefficient of diffusion of oxygen ($cm^2/s$) | $0.14 \times 10^-$ $4x \exp[-138000/RT]$ $0.33 \times \exp[-126000/RT]$ | In titanium in fusion In the molten titanium in its beta β-Ti |
| Young's module | 110-140 Gpa | 200 Gpa |
| Tear resistant | 850-900 Mpa | 600 Mpa |
| Tenacity | 33-110 Mpa · $m^{1/2}$ | 7-13 Mpa · $m^{1/2}$ |
| Elongation at break (%) | 13-16% | — |
| Vickers Hardness (HV) | 290-350 | 1200 |
| Melting temperature | 1668° C. | 2700° C. |
| CTE (20-200° C.) | $8.5 \cdot 10^{-6}$/K | $10.5 \cdot 10^{-6}$/K |

In such a process, energy quantity transfer, heat transfer, mass transfer and chemical reaction interact intensively with one another. Therefore, it is necessary to understand the reaction of the $Ti/ZrO_2$ interactive mixture for the implementation of such a method. This results in the control of the melting temperature of the $Ti/ZrO_2$ interactive mixture, the transfer of heat and mass between the molten titanium and the molten zirconia. Such a reaction is reactive, unstable and varies with the time of exposure to the fusion. In addition, the chemical reaction of the interactive $Ti/ZrO_2$ mixture affects the temperature of the mixture and the oxygen concentration.

As the concentration of zirconia Zr increases, titanium Ti reacts with oxygen O and zirconia becomes oxygen deficient. The heat of the reaction raises the temperature of the mixture and accelerates the diffusion of Ti, O, Zr, which increases the concentration of Ti, O, Zr and accelerates the reaction of the $Ti/ZrO_2$ interactive mixture again, thus forming an interaction intense between heat transfer, mass transfer and chemical reaction.

The chemical reactions between Ti and $ZrO_2$ are not thermodynamically favorable, because the free Gibbs enthalpy functions of the following equations are positive or slightly negative at the melting temperature of 1700° C.

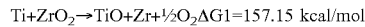

$Ti+ZrO_2 \rightarrow TiO+Zr+\frac{1}{2}O_2 \Delta G_1 = 157.15$ kcal/mol

$Ti+ZrO_2 \rightarrow TiO+Zr \Delta G_2 = 33.14$ kcal/mol

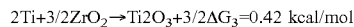

$2Ti+3/2ZrO_2 \rightarrow Ti_2O_3+3/2Zr \Delta G_3 = 0.42$ kcal/mol

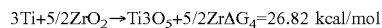

$3Ti+5/2ZrO_2 \rightarrow Ti_3O_5+5/2Zr \Delta G_4 = 26.82$ kcal/mol

According to the following chemical reactions, titanium cannot be a reducing agent for zirconium oxide. On the other hand, titanium can reduce zirconium oxide at high temperatures. The existence of titanium sub-oxides ($Ti_2O$, $Ti_3O$) and oxygen deficiency of zirconia ($ZrO_2$-x) leads to the total reduction of zirconia by titanium during solidification.

In an advantageous embodiment, the oxygen content during the melting of the $Ti/ZrO_2$ interactive mixture is substantially zero during the first second of the laser melting. After 5 seconds, there is a rapid increase in the oxygen content, thus forming $TiO_2$ titanium dioxide by reacting with titanium.

Indeed, the melting temperature of the $Ti/ZrO_2$ interactive mixture (titanium in the liquid phase) increases as the laser exposure time is maintained, leading to the activation of Zr and O and the increase in concentration gradient. Meanwhile, by increasing the temperature, the Zr and O levels increase, which induces the diffusion of Ti, Zr and titanium oxides ($Ti_2O$, $Ti_3O$).

Therefore, due to the presence of additional oxygen and Zr available for reaction with titanium, the reaction of the $Ti/ZrO_2$ interactive mixture becomes more intensive, remember that the reaction of the interactive mixture $Ti/ZrO_2$ is not isolated. thermal.

The heat released by the reaction also increases the temperature locally and accelerates the diffusion of oxygen. On the other hand, the diffusion of oxygen is accelerated because of its smaller atomic radius.

The melting temperature is an important parameter that influences the diffusion of oxygen. In order to improve the fluidity of the titanium during the reaction, it is necessary to preheat the reaction chamber before melting.

During the manufacturing process, a portion of the oxygen atoms react with the titanium Ti to form titanium oxide ($TiO_2$), advantageously contributing to the improvement of the hardness of the Ti phase and consequently to the improvement mechanical properties of the composites.

The mechanical properties of the $Ti/ZrO_2$ composite material are greatly affected by the formation of titanium oxide in the titanium matrix.

The hardness increases considerably with the increase of the $ZrO_2$ content up to 1 vol. Overall, the compressive strength of the $Ti/ZrO_2$ composite increases in a manner similar to the hardness. Even a very small amount of $ZrO_2$ contributes to the formation of titanium oxide, which leads to an improvement in the hardness as well as the brittleness of the $Ti/ZrO_2$ composite material beyond a certain amount.

According to the invention, the part issuing from the melting chamber undergoes a thermal treatment under nitrogen according to which it is introduced into a metal thermal furnace capable of rising up to 3000° C. where nitrogen (N) is added under its control. gaseous form in proportions between 5 and 10% under a pressure advantageously between 10 and 12 bar and in a temperature range between 850° C. and 1850° C., to improve the tensile stress of 200 MPa to more than 600 MPa maintaining the same elasticity. This heat treatment is intended to give additional hardness by maintaining the same elasticity and decreasing the residual stresses between the layers made successively of the piece. Ideally, the thermal treatment under nitrogen is carried out at 1100° C. for 45 minutes.

Unless otherwise stated, the contents indicated are expressed as a percentage by volume of the material.

The invention claimed is:
1. An additive manufacturing method of shaping a composite material of metal alloy and ceramic, through the use of a laser-type modulable energy source for Selective Laser Melting (SLM), said method comprising the steps of:
   i. preparing a homogeneous mixture of dry metal powder and dry ceramic powder, the particle size of the metal powder being micrometric and the particle size of the ceramic powder being nanometric, ii. exposing said mixture to a focused energy source which selectively melts part of a bed of said powder mixture, wherein the nanoceramic powder is stabilized zirconia, said method being characterized in that said zirconia is yttria-stabilized zirconia with a concentration of yttrium oxide of between 11 and 30% by volume of the zirconia.

2. The method of claim 1, wherein the metal powder comprises pure titanium or an alloy comprising Ti6AlV4.

3. The method of claim 1 or 2, wherein the ceramic powder comprises zirconia.

4. The Process according to claim 3, in which the zirconia is of stabilized zirconia type in quadratic form.

5. The Method according to claim 4, wherein the zirconia is YTtriated zirconia type (YSZ) with a concentration of yttrium oxide between 11% and 30% by volume of the zirconia.

6. The Method according to claim 5 wherein the particle size of the metal powder is between 5 and 50 microns and the particle size of the ceramic powder is between 5 and 250 nm.

7. The Method according to claim 6 wherein the focused energy source is a laser spot.

8. The Method according to claim 6 wherein the exposure time of a melting zone is less than 5 seconds.

9. The Method according to claim 6 wherein the thickness of the powder bed is between 5 and 50 microns.

10. The method according to claim 6 wherein the melting temperature is greater than 1650° C.

11. The Method according to claim 6 wherein the proportion of metal powder is greater than 40% by volume and less than 99.5% by volume.

12. The Method according to one claim 6 wherein the proportion of ceramic powder is greater than 0.4% by volume and less than 60% by volume.

* * * * *